US011400382B2

(12) United States Patent
Tang et al.

(10) Patent No.: US 11,400,382 B2
(45) Date of Patent: Aug. 2, 2022

(54) METHOD AND DEVICE OF DISPLAYING A PROGRESS BAR, COMPUTING DEVICE, AND READABLE STORAGE MEDIUM

(71) Applicant: Shanghai Bilibili Technology Co., Ltd., Shanghai (CN)

(72) Inventors: Junxing Tang, Shanghai (CN); Pengcheng Li, Shanghai (CN); Juan Chen, Shanghai (CN); Zhiwei Chen, Shanghai (CN); Hanming Li, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 50 days.

(21) Appl. No.: 17/018,250

(22) Filed: Sep. 11, 2020

(65) Prior Publication Data

US 2021/0084376 A1     Mar. 18, 2021

(30) Foreign Application Priority Data

Sep. 12, 2019 (CN) .......................... 201910862857.7

(51) Int. Cl.
*H04N 21/466* (2011.01)
*H04N 21/472* (2011.01)
(Continued)

(52) U.S. Cl.
CPC .............. *A63F 13/86* (2014.09); *A63F 13/67* (2014.09); *H04N 21/4667* (2013.01); *H04N 21/47217* (2013.01); *H04N 21/482* (2013.01)

(58) Field of Classification Search
CPC ......... H04N 21/4667; H04N 21/47217; H04N 21/482; H04N 21/8456
See application file for complete search history.

(56) References Cited

U.S. PATENT DOCUMENTS

| 9,066,122 B1* | 6/2015 | Rattazzi | H04N 21/44204 |
| 2015/0135070 A1* | 5/2015 | You | H04N 21/42204 |
| | | | 715/716 |

(Continued)

FOREIGN PATENT DOCUMENTS

| CN | 105792006 A | 7/2016 |
| CN | 105812889 A | 7/2016 |

(Continued)

*Primary Examiner* — Rong Le
(74) *Attorney, Agent, or Firm* — BakerHostetler (57) ABSTRACT

Techniques of generating and displaying an attention curve relative to a progress bar are described in the present disclosure. The disclosed techniques include sending a request for acquiring a target video that is divided into a plurality of predetermined time period; receiving data comprising a number of comment events and a number of drag progress bar events within each preset time period of the target video; determining an attention value corresponding each predetermined time period based on the number of the comment events and the number of the drag progress bar events within each predetermined time period of the target video; generating an attention curve based on a plurality of attention values corresponding to the plurality of predetermined time periods of the target video; and displaying the attention curve relative to a progress bar, wherein amplitude values of the attention curve relative to the progress bar are in proportion to the plurality of attention values corresponding to the plurality of predetermined time periods of the target video.

13 Claims, 3 Drawing Sheets

(51) Int. Cl.
*H04N 21/482* (2011.01)
*A63F 13/86* (2014.01)
*A63F 13/67* (2014.01)

(56) References Cited

U.S. PATENT DOCUMENTS

2016/0105697 A1* 4/2016 Lee .................. H04N 21/44204
　　　　　　　　　　　　　　　　　　　　　　725/9
2016/0192003 A1* 6/2016 Casagrande ........ H04L 65/4084
　　　　　　　　　　　　　　　　　　　　　　725/14

FOREIGN PATENT DOCUMENTS

| CN | 106303675 A | 1/2017 |
| CN | 107454465 A | 12/2017 |
| CN | 107666623 A | 2/2018 |
| CN | 108235126 A | 6/2018 |
| CN | 108924576 A | 11/2018 |
| CN | 109040796 A | 12/2018 |
| CN | 109104642 A | 12/2018 |
| CN | 110191358 A | 8/2019 |

* cited by examiner

METHOD AND DEVICE OF DISPLAYING A PROGRESS BAR, COMPUTING DEVICE, AND READABLE STORAGE MEDIUM

CROSS-REFERENCE TO RELATED APPLICATION

The present invention claims priority of Chinese patent application No. 201910862857.7, filed on Sep. 12, 2019. The entire disclosure of the above-identified application is hereby incorporated by reference and made a part of this specification.

BACKGROUND

In view of existing scenes playing streaming media video, it is usually required for users to play the target video from the beginning to completely watch the entire target video. However, the target video often contains multiple highlights, and it is difficult to directly locate highlights of the target video based on existing video playback methods. Therefore, the users cannot just watch the highlights but have to spend a lot of time on watching uninterested segments, which wastes time and has poor user experience. In regard to prior arts, the users can drag a progress bar in a playback interface to adjust the playback process. However, it is difficult for the users to quickly locate the highlights that requires repeated user operations and is easy to miss interested highlights, which is a waste of time and consumes a lot of bandwidth.

SUMMARY

The purpose of the present invention is to provide a method and a device of generating and displaying an attention curve relative to a progress bar, a computing device and a readable storage medium, which is convenient for users to locate highlights of a target video quickly, thereby improving the video playback experience and reducing the bandwidth consumption.

One aspect of the present invention provides a method of displaying a progress bar, applied to a client, the method comprising the following steps:

sending a request message for acquiring a target video to a server and receiving user behavior data corresponding to the target video sent by the server, wherein the user behavior data includes: a number of comment events and a number of drag progress bar events within each preset time period of the target video;

calculating an attention value of each preset time period separately according to the number of the comment events and the number of the drag progress bar events within each preset time period of the target video; and drawing an attention curve for reflecting a size of the attention value of each preset time period at the progress bar according to the attention value of each preset time period.

Preferably, after the drawing the attention curve for reflecting a size of the attention value of each preset time period at the progress bar according to the attention value of each preset time period, the method further comprises:

during playing the target video, when comment events and/or drag progress bar events generated by the client are detected, adding the comment events and/or the drag progress bar events to a playback log corresponding to the target video; and sending the playback log to the server when the playback of the target video is terminated.

Preferably, the method further comprises:

calculating the attention value of each preset time period separately according to the following formula:

$$\text{Attention Value} = (|NBSE/SC|+1) \times NDPBE;$$

wherein the NBSE indicates the number of the comment events, the SC indicates a setting coefficient, and the NDPBE indicates the number of the drag progress bar events.

Another aspect of the present invention provides a method of displaying a progress bar, applied to a server, the method comprising the following steps:

receiving a request message for acquiring a target video sent by a client;

obtaining user behavior data corresponding to the target video, wherein the user behavior data includes: a number of comment events and a number of drag progress bar events within each preset time period of the target video; and sending the user behavior data to the client.

Preferably, the method further comprises:

periodically according to playback logs sent by multiple clients within a set time interval based on the set time interval, counting the number of the comment events and the number of the drag progress bar events within each preset time period of the target video, wherein a playback log of a client comprises: comment events and/or drag progress bar events generated by the client during playing the target video; and adding the number of the comment events and the number of the drag progress bar events after counting within each preset time period of the target video to generated user behavior data corresponding to the target video to update the user behavioral data.

Preferably, the periodically according to playback logs sent by multiple clients within the set time interval based on the set time interval, counting the number of the comment events and the number of the drag progress bar events within each preset time period of the target video, specifically comprises:

determining a preset time period of each comment event and a preset time period of each drag progress bar event in each playback log; and in regard to a preset time period of the target video, counting the total amount of the comment events belonging to the preset time period and the total amount of the drag progress bar events belonging to the preset time period in all playback logs.

Another aspect of the present invention provides a device of displaying a progress bar, applied to a client, the device comprising the following components:

a processing module, sending a request message for acquiring a target video to a server and receiving user behavior data corresponding to the target video sent by the server; wherein, the user behavior data includes: a number of comment events and a number of drag progress bar events within each preset time period;

a calculating module, calculating an attention value of each preset time period separately according to the number of the comment events and the number of the drag progress bar events within each preset time period of the target video; and a drawing module, drawing an attention curve for reflecting a size of the attention value of each preset time period at the progress bar according to the attention value of each preset time period.

Another aspect of the present invention provides a device of displaying a progress bar, applied to a server, the device comprising the following components:

a receiving module, receiving a request message for acquiring a target video sent by a client;

an obtaining module, obtaining user behavior data corresponding to the target video, wherein the user behavior data includes: a number of comment events and a number of drag progress bar events within each preset time period of the target video; and a sending module, sending the user behavior data to the client.

Another aspect of the present invention provides a computing device, comprising a memory, a processor and computer programs stored in the memory and executed by the processor, wherein the processor executes the computer programs for implementing the steps of the method of displaying a progress bar described above.

Another aspect of the present invention provides a computer-readable storage medium, which stores computer programs executed by a processor to implement the steps of the method of displaying a progress bar described above.

The method and device of displaying a progress bar, computing device, and readable storage medium are provided in the present invention, video segments that the user pays attention to in the target video are determined by mining the user's behavior data during playing the target video, and the attention curve is drawn at the progress bar according to the user's behavior data, so that it is convenient for the user who plays the target video can quickly locate the highlights of the target video, so as to improve the video playing experience. In addition, because of the user can selectively watch the target video, and the user can directly locate the highlights, thus the bandwidth is saved.

BRIEF DESCRIPTION OF THE DRAWINGS

By reading detailed descriptions of the following preferred embodiments, various other advantages and benefits will become clear to those skilled in the art. The drawings are for the purpose of showing preferred embodiments only and are not considered to be a limitation of the present invention. And in the whole drawings, the same parts are represented by the same reference symbols. In the drawings.

DETAILED DESCRIPTION OF ILLUSTRATIVE EMBODIMENTS

In order to make the purpose of the present invention, technical solutions and advantages clearer, the present invention will be further described in detail below in combination with the drawings and embodiments. It should be understood that the specific embodiments described herein are only used to explain the embodiments of the present invention and are not intended to limit the present invention. Based on the embodiments of the present invention, all other embodiments obtained by those skilled in the art without creative efforts are within the scope of protection of the embodiments of the present invention.

First Embodiment

Figure 1:
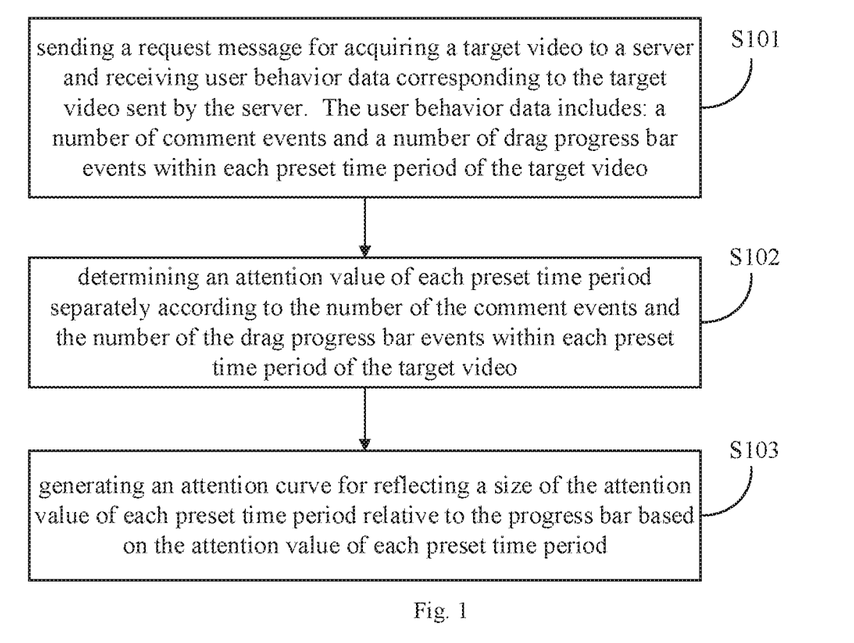
FIG. 1 is an optional flowchart of a method of displaying a progress bar of a first embodiment.

An embodiment of the present invention provides a method of displaying a progress bar, applied to a client. FIG. 1 is a flowchart of the method of displaying a progress bar. As shown in FIG. 1, the method specifically includes the following steps:

Step S101: sending a request message for acquiring a target video to a server and receiving user behavior data corresponding to the target video sent by the server. The user behavior data includes: a number of comment events and a number of drag progress bar events within each preset time period of the target video.

Specifically, the number of comment events within a preset time period is equal to the total amount of the comment events generated by all clients who have played the target video within the preset time period; wherein, the comment events represent user comments which can float on a video playback interface issued by the client during playing the target video.

The number of drag progress bar events within a preset time period is equal to the total number of the drag progress bar events generated by all clients who have played the target video within the preset time period; wherein, the drag progress bar events represent behaviors of users dragging the progress bar to adjust playback start time that is generated during playing the target video by the client.

In this embodiment, for the convenience of counting the number of the comment events and the number of drag progress bar events of the target video, the target video is divided into multiple preset time periods, and the duration of each preset time period is a setting duration.

In actual applications, during watching the target video, a user can comment on a video segment in the target video through a comment function. In addition, when the user wants to watch a video segment in the target video, the progress bar can be dragged to locate the target video segment. Therefore, if the number of comment events within a preset time period is getting more, it means that the target video content within the preset time period is more exciting, that is, the user pays more attention to the target video content of the preset time period. If the number of drag progress bar events within a preset time period is getting more, it means the number of times that the user watches the target video content repeatedly within the preset time period is getting more, that is, the user pays more attention to the target video content of the preset time period.

Step S102: calculating an attention value of each preset time period separately according to the number of the comment events and the number of the drag progress bar events within each preset time period of the target video.

Specifically, the attention value of each preset time period is calculated separately using the following formula:

$$\text{Attention Value} = (|NBSE/SC|+1) \times NDPBE;$$

where the NBSE indicates the number of the comment events, the SC indicates a setting coefficient, and the NDPBE indicates the number of the drag progress bar events.

Preferably, the setting coefficient is 50.

In this embodiment, if the number of the comment events and/or the number of the drag progress bar events in a preset time period is getting more, the corresponding attention value of the preset time period is higher, which means both of the value of the number of the comment events and the value of the number of the drag progress bar events are in proportion to the attention value. It should be noted that, in practical applications, the attention value can also be calculated using other formulas or logics.

Step S103: drawing an attention curve for reflecting a size of the attention value of each preset time period at the progress bar according to the attention value of each preset time period.

Among that, an amplitude value of the attention curve is in proportion to the attention value.

Specifically, step S103 further includes:

Step A1: determining location areas at the progress bar in the video playback interface of each preset time period in the target video.

Step A2: drawing attention points on the location areas at the corresponding progress bar according to the attention value of each preset time period.

Among that, the attention points are located above the progress bar, and distance values between the attention points and the progress bar are in proportion to the attention values.

Step A3: connecting the attention points within each preset time period in turn to draw the attention curve.

Figure 2:
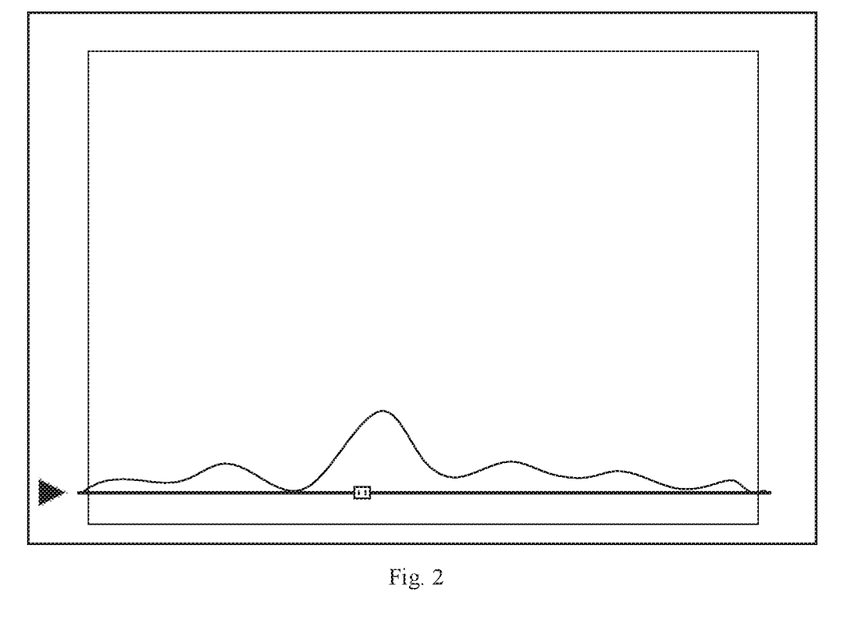
FIG. 2 is a schematic diagram of drawing an attention curve at the progress bar of the first embodiment.

FIG. 2 is a schematic diagram of drawing an attention curve at the progress bar. As shown in FIG. 2, the greater the amplitude of the attention curve is, the more exciting the corresponding video content is. In this embodiment, when the client requests the target video from the server, the server feedbacks user behavior data corresponding to the target video and audio/video data of the target video to the client to provide the client plays the target video in the video playback interface according to the audio/video data, and draws the attention curve at the progress bar in the target video playback interface according to the user behavior data. Thus, the highlights in the target video can be reflected through the attention curve, enabling the user to locate highlights in the target video quickly and play the target video selectively.

Further, after the step S103, the method further includes:

Step B1: during playing the target video, when the comment events and/or the drag progress bar events generated by the client are detected, adding the comment events and/or the drag progress bar events to a playback log corresponding to the target video.

Step B2: sending the playback log to the server when the playback of the target video is terminated.

In this embodiment, the comment events and the drag progress bar events generated during the user watching the target video are monitored, and playback time points corresponding to generating the comment events and playback time points corresponding to drag ending locations in the drag progress bar events are added in the playback log, and when the playback of the target video is terminated, the playback log is sent to the server, it should be noted that each of all clients who have played the target video sends a playback log to the server after the playback of the target video is terminated, to provide the server counts the number of the comment events and the number of the drag progress bar events within each preset time period of the target video according to the playback logs sent from all the clients that have played the target video, so that the clients who plays the target video later can draw the attention curve.

Second Embodiment

Figure 3:
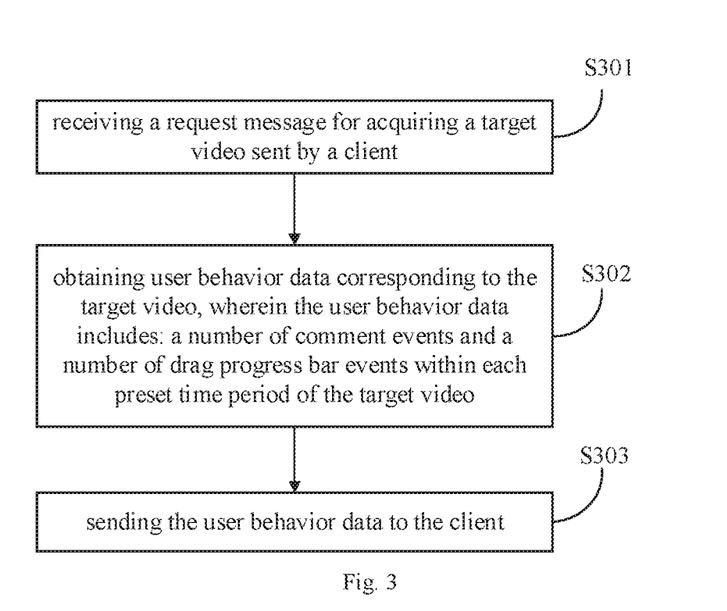
FIG. 3 is an optional flowchart of a method of displaying a progress bar of a second embodiment.

An embodiment of the present invention provides a method of displaying a progress bar, applied to a server. FIG. 3 is an optional flowchart of the method of displaying a progress bar. As shown in FIG. 3, the method specifically includes the following steps:

Step S301: receiving a request message for acquiring a target video sent by a client.

Step S302: obtaining user behavior data corresponding to the target video, wherein the user behavior data includes: a number of comment events and a number of drag progress bar events within each preset time period of the target video.

Specifically, the number of comment events within a preset time period is equal to the total amount of the comment events generated by all clients who have played the target video within the preset time period, wherein, the comment events represent user comments which can float on a video playback interface issued by the client during playing the target video.

The number of drag progress bar events within a preset time period is equal to the total number of the drag progress bar events generated by all clients who have played the target video within the preset time period. Wherein, the drag progress bar events represent the behaviors of users dragging the progress bar to adjust playback start time that is generated during playing the target video by the client.

In this embodiment, for the convenience of counting the number of the comment events and the number of drag progress bar events of the target video, the target video is divided into multiple preset time periods, and the duration of each preset time period is a setting duration.

Preferably, an intermediate database is configured in the server, in step S302, the server obtains user behavior data corresponding to the target video from the intermediate database.

Step S303: sending the user behavior data to the client.

Specifically, the server may determine the user behavior data of the target video in one of the following two ways;

first way: periodically according to playback logs sent by multiple clients within a set time interval based on the set time interval, counting the number of the comment events and the number of the drag progress bar events within each preset time period of the target video to be served as the user behavior data of the target video; wherein a playback log of a client includes: comment events and/or drag progress bar events generated by the client during playing the target video.

second way: periodically according to playback logs sent by multiple clients within a set time interval based on the set time interval, counting the number of the comment events and the number of the drag progress bar events within each preset time period of the target video; wherein a playback log of a client comprises: comment events and/or drag progress bar events generated by the client during the playback of the target video;

adding the number of the comment events and the number of the drag progress bar events after counting within each preset time period of the target video to generated user behavior data corresponding to the target video to update the user behavioral data.

In the first method, the user behavior data of the target video is determined according to the playback log received within the set time interval; in the second method, the user behavior data of the target video is determined according to all the playback logs received.

Preferably, in the playback log specifically includes: the playback time points corresponding to generating the comment events and the playback time points corresponding to drag ending locations in the drag progress bar events; for example, if the user issues comment information at the 23rd minute of the target video which has a playback time of 50 minutes, issued time of the 23rd minute of the comment information is added to the playback log; for another example, the user finally locates a first position of the progress bar by dragging the progress bar, and the first position corresponds to the 40th minute of the target video, then the playback time point (40 minutes) corresponding to a drag end position (the first position) is added in the playback log.

After the user behavior data corresponding to the target video is generated or updated, the client stores the user behavior data in the intermediate database.

Further, the periodically according to playback logs sent by multiple clients within the set time interval, counting the number of the comment events and the number of the drag progress bar events within each preset time period of the target video, specifically includes:

Step C1: determining a preset time period of each comment event and a preset time period of each drag progress bar event in each playback log are determined; and Step C2: in regard to a preset time period of the target video, counting the total amount of the comment events belonging to the preset time period and the total amount of the drag progress bar events belonging to the preset time period in all playback logs.

In this embodiment, the server determines the user behavior data in each preset time period of the target video based on the user behavior data of each client who has played the target video, and when a client plays the target video, the server feedbacks the user behavior data to the client, to provide the client draw the attention curve at the progress bar according to the user behavior data, to enable the user to select the highlights in the target video to play.

Third Embodiment

Figure 4:
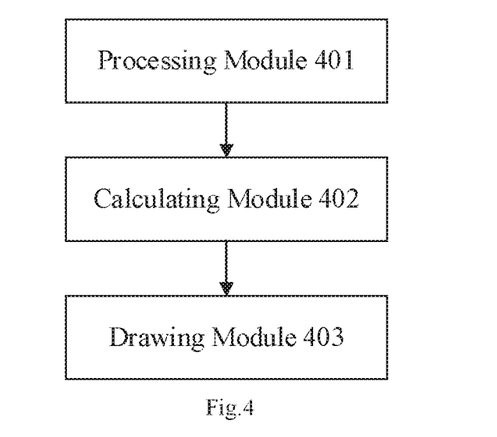
FIG. 4 is a schematic diagram of functional blocks of a device of displaying a progress bar of a third embodiment.

Based on the method of displaying a progress bar provided in the first embodiment above, this embodiment provides a progress bar device, specifically, FIG. 4 is an optional schematic diagram of functional blocks of the device of displaying a progress bar, the device of displaying a progress bar is divided into one or more program modules, and the one or more program modules are stored in a storage medium and executed by one or more processors to complete the present invention. The program modules referred to in the present invention refers to a series of computer program instruction segments capable of performing specific functions, and is more suitable for describing the execution process of the device of displaying a progress bar in the storage medium than the program itself, the following description will specifically introduce functions of each of the program modules of this embodiment.

As shown in FIG. 4, the device of displaying a progress bar provided by the present invention, specifically comprising the following components:

A processing module 401, sending a request message for acquiring a target video to a server and receiving user behavior data corresponding to the target video sent by the server; wherein, the user behavior data includes: a number of comment events and a number of drag progress bar events within each preset time period of the target video.

Specifically, the number of comment events within a preset time period is equal to the total amount of the comment events generated by all clients who have played the target video within the preset time period; wherein, the comment events represent user comments which can float on a video playback interface issued by the client during playing the target video.

The number of drag progress bar events within a preset time period is equal to the total number of the drag progress bar events generated by all clients who have played the target video within the preset time period; wherein, the drag progress bar events represent behaviors of users dragging the progress bar to adjust playback start time that is generated during playing the target video by the client.

A calculating module 402, calculating an attention value of each preset time period separately according to the number of the comment events and the number of the drag progress bar events within each preset time period.

Specifically, the attention values of each preset time period are calculated separately using the following formula:

Attention Value=(|NBSE/SC|+1)×NDPBE;

where the NBSE indicates the number of the comment events, the SC indicates a setting coefficient, and the NDPBE indicates the number of the drag progress bar events.

Preferably, the setting coefficient is 50.

A drawing module 403, drawing an attention curve for reflecting a size of the attention value of each preset time period at the progress bar according to the attention value of each preset time period.

Specifically, the drawing module 403 is further:

determining location areas at the progress bar in the target video playback interface of each preset time period in the target video;

drawing attention points on the location areas at the corresponding progress bar according to the attention value of each preset time period; among that, the attention points are located above the progress bar, and distance values between the attention points and the progress bar are in proportion to the attention values;

connecting the attention points within each preset time period in turn to draw the attention curve.

Further, the device further includes:

A monitoring module, during playing the target video, when the comment events and/or the drag progress bar events generated by the client are detected, adding the detected comment events and/or the drag progress bar events to a playback log corresponding to the target video; and sending the playback log to the server when the playback of the target video is terminated.

Fourth Embodiment

Figure 5:
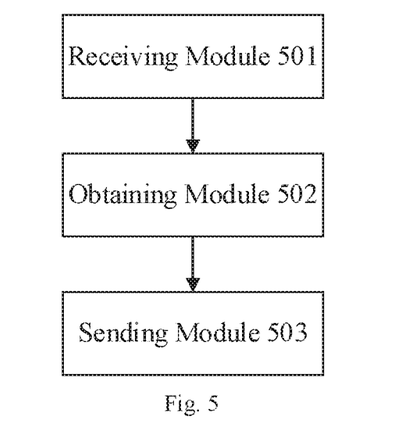
FIG. 5 is a schematic diagram of functional blocks of a device of displaying a progress bar of a fourth embodiment.

Based on the method of displaying a progress bar provided in the second embodiment above, this embodiment provides a device of displaying a progress bar, specifically. FIG. 5 is an optional schematic diagram of the device of displaying a progress bar, the device of displaying a progress bar is divided into one or more program modules, and the one or more program modules are stored in a storage medium and executed by one or more processors to complete the present invention. The program modules referred to in the present invention refers to a series of computer program instruction segments capable of performing specific functions, and is more suitable for describing the execution process of the device of displaying a progress bar in the storage medium than the program itself, the following description will specifically introduce functions of each of the program modules of this embodiment.

As shown in FIG. 5, the device of displaying a progress bar provided by the present invention, specifically comprising the following components:

a receiving module 501, receiving a request message for acquiring a target video sent by a client.

An obtaining module 502, obtaining user behavior data corresponding to the target video, wherein the user behavior data includes: a number of comment events and a number of drag progress bar events within each preset time period of the target video.

Specifically, the number of comment events within a preset time period is equal to the total amount of the comment events generated by all clients who have played the target video within the preset time period. Wherein, the comment events represent user comments which can float on a video playback interface issued by the client during playing the target video.

The number of drag progress bar events within a preset time period is equal to the total number of the drag progress bar events generated by all clients who have played the target video within the preset time period; wherein, the drag progress bar events represent the behaviors of users dragging the progress bar to adjust playback start time that is generated during playing the target video by the client.

A sending module 503, sending the user behavior data to the client.

Further, the device further comprises:

A counting module, periodically according to playback logs sent by multiple clients within a set time interval based on the set time interval, counting the number of the comment events and the number of the drag progress bar events within each preset time period of the target video; wherein a playback log of a client comprises: comment events and/or drag progress bar events generated by the client during the playback of the target video, and adding the number of the comment events and the number of the drag progress bar events after counting within each preset time period of the target video to generated user behavior data corresponding to the target video to update the user behavioral data.

Further, in regard to the counting module performing the step of periodically according to playback logs sent by multiple clients within a set time interval based on the set time interval, counting the number of the comment events and the number of the drag progress bar events within each preset time period of the target video, the counting module further:

determining a preset time period of each comment event and a preset time period of each drag progress bar event in each playback log; and in regard to a preset time period of the target video, counting the total amount of the comment events belonging to the preset time period and the total amount of the drag progress bar events belonging to the preset time period in all playback logs.

Fifth Embodiment

Figure 6:
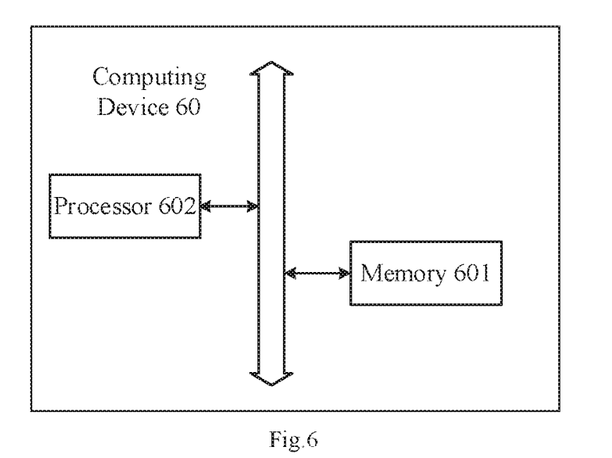
FIG. 6 is a schematic diagram of hardware architecture of a computing device of a fifth embodiment.

The embodiment also provides a computing device may be a smartphone, tablet, laptop, desktop computer, rack server, blade server, tower server, or cabinet server (including stand-alone servers, or a cluster of multiple servers) that can execute programs, and so on. As shown in FIG. 6, the computing device 60 in the embodiment includes, but is not limited to, a memory 601 that can communicate with each other through a system bus, a processor 602. It needs to be noted that FIG. 6 shows only a computing device 60 having components 601-602, but it is understood that it is not required to implement all of the shown components and that more or fewer parts can be implemented in lieu thereof.

In the embodiment, the memory 601 (that is a readable storage medium) includes a flash memory, a hard disk, a multimedia card, a card type memory (e.g., SD or DX memory, etc.), a random access memory (RAM), a static random access memory (SRAM), a read-only memory (ROM), electrically erasable programmable read-only memory (EEPROM), programmable read-only memory (PROM), magnetic memory, magnetic disk, optical disk, etc. In some embodiments, the memory 601 may be an internal storage module of the computing device 60 such as the hard disk or memory of the computing device 60. In other embodiments, the memory 601 may also be an external storage device of the computing device 60, such as a plugged hard disk provided on the computing device 60, a smart media card (SMC), a secure digital (SD) card, a flash memory card, and the like. Of course, the memory 601 may also include both an internal storage module and an external storage device of the computing device 60. In the embodiment, the memory 601 is generally used to store an operating system and various types of application software installed in the computing device 60 such as program codes of the device of displaying a progress bar of the third or the fourth embodiment and the like. In addition, the memory 601 may also be used to temporarily store various types of data that have been or will be outputted.

The processor 602, in some embodiments, may be a Central Processing Unit (CPU), a controller, a microprocessor, or other data processing chips. The processor 602 is generally used to control the overall operation of the computing device 60.

Specifically, in the embodiment, the processor 602 is used to execute the program of a method of displaying a progress bar stored in the processor 602, when the program of the method of displaying a progress bar is executed, the following steps are implemented:

sending a request message for acquiring a target video to a server and receiving user behavior data corresponding to the target video sent by the server, wherein the user behavior data includes: a number of comment events and a number of drag progress bar events within each preset time period of the target video;

calculating an attention value of each preset time period separately according to the number of the comment events and the number of the drag progress bar events within each preset time period of the target video; and drawing an attention curve for reflecting a size of the attention value of each preset time period at the progress bar according to the attention value of each preset time period.

The specific embodiment process of the above method steps can be referred to the first embodiment, which is not repeatedly described in this embodiment.

Further, in this embodiment, the processor 602 is used to execute the program of the method of displaying a progress bar stored in the processor 602. When the program of the method of displaying a progress bar is executed, the following steps are implemented:

receiving a request message for acquiring a target video sent by a client;

obtaining user behavior data corresponding to the target video, wherein the user behavior data includes: a number of comment events and a number of drag progress bar events within each preset time period of the target video; and sending the user behavior data to the client.

The process of the specific embodiment of the processing steps described above refers to the second embodiment, which is not repeated in this embodiment.

Embodiment 6

This embodiment also provides a computer-readable storage medium, such as a flash memory, a hard disk, a multimedia card, a card-type memory (for example, SD or DX memory, etc.), a random access memory (RAM), a static random access memory (SRAM), a read only memory (ROM), an electrically erasable programmable read-only memory (EEPROM), a programmable read-only memory (PROM), a magnetic memory, magnetic disk, an optical disk, a server, an APP store, etc., on which computer programs are stored. When the computer program is executed by the processor, the following method steps are implemented:

sending a request message for acquiring a target video to a server and receiving user behavior data corresponding to the target video sent by the server, wherein the user behavior data includes: a number of comment events and a number of drag progress bar events within each preset time period of the target video;

calculating an attention value of each preset time period separately according to the number of the comment events and the number of the drag progress bar events within each preset time period of the target video; and drawing an attention curve for reflecting a size of the attention value of each preset time period at the progress bar according to the attention value of each preset time period.

The process of the specific embodiment of the processing steps described above refers to the first embodiment, which is not repeated in this embodiment.

In addition, the computer program executed by the processor can further implement the following method steps:

receiving a request message for acquiring a target video sent by a client;

obtaining user behavior data corresponding to the target video, wherein the user behavior data includes: a number of comment events and a number of drag progress bar events within each preset time period of the target video; and sending the user behavior data to the client.

The process of the specific embodiment of the processing steps described above refers to the second embodiment, which is not repeated in this embodiment.

It should be noted that, in this article, the terms "including", "including" or any other variants thereof are intended to cover non-exclusive inclusion, so that a process, method, article or device including a series of elements includes not only those elements, It also includes other elements not explicitly listed, or elements inherent to such a process, method, article, or device. Without more restrictions, an element limited by the sentence "including a . . . " does not exclude that there are other identical elements in the process, method, article, or device that includes the element.

The above-mentioned serial numbers of the embodiments of the present invention are merely for description, and do not represent the superiority or inferiority of the embodiments.

Through the description of the above embodiments, those skilled in the art can clearly understand that the methods in the above embodiments can be implemented by means of software plus a necessary general hardware platform, and of course, can also be implemented by hardware, hut in many cases the former is better Implementation.

The embodiments described above are just preferred embodiments of the present invention and thus do not limit the patent scope of the present invention. Any equivalent structure, or equivalent process transformation made according to the contents of the description and the drawings of the present invention or any direct or indirect application to other related arts shall be also included in the patent protection scope of the present invention.

What is claimed is:

1. A method of displaying an attention curve relative to a progress bar, comprising:

sending a request for acquiring a target video by a client computing device;

receiving data associated with the target video, wherein the target video is divided into a plurality of predetermined time periods, and the data comprise a number of comment events and a number of dragging progress bar events within each predetermined time period of the target video;

determining an attention value corresponding each predetermined time period based on the number of comment events and the number of dragging progress bar events within each predetermined time period of the target video;

generating an attention curve based on a plurality of attention values corresponding to the plurality of predetermined time periods of the target video; and displaying the attention curve relative to a progress bar, wherein amplitude values of the attention curve relative to the progress bar are in proportion to the plurality of attention values corresponding to the plurality of predetermined time periods of the target video;

wherein the method further comprises:

determining the attention value corresponding to each predetermined time period based on a formula:

Attention Value=(|NBSE/SC|+1)×NDPBE, wherein the NBSE indicates the number of comment events, the SC indicates a setting coefficient, and the NDPBE indicates the number of dragging progress bar events.

2. The method of claim 1, further comprising:

detecting at least one of comment events or dragging progress bar events generated by the client computing device during playing the target video:

adding the detected comment events or dragging progress bar events to a playback log corresponding to the target video.

3. The method of claim 2, further comprising:

sending the playback log to a server computing device when a playback of target video is terminated, wherein the server computing device other playback logs from other client computing devices which have played the target video.

4. A method of displaying an attention curve relative to a progress bar, comprising:

receiving a request for acquiring a target video from a client computing device;

obtaining data associated with the target video, wherein the target video is divided into a plurality of predetermined time periods, and the data comprise a number of comment events and a number of dragging progress bar events within each predetermined time period of the target video;

sending the data to the client computing device for display of an attention curve relative to a progress bar, wherein the attention curve is generated based on determining a plurality of attention values corresponding to the plurality of predetermined lime periods according to the number of comment events and the number of dragging progress bar events within each predetermined time period of the target video;
wherein the method further comprises:
determining the number of comment events and the number of dragging progress events within each predetermined time period based on a plurality of playback logs sent from a plurality of client computing devices, wherein each of the plurality of playback logs comprises at least one of comment events or dragging progress bar events generated by a corresponding client computing device during playing the target video; and
determining which predetermined time period among the plurality of predetermined time periods each comment event or dragging progress bar event compromised in each of the plurality of playback logs belongs to.

5. The method of claim 4, further comprising:
updating the data associated with the target video by periodically determining an updated number of comment events and an updated number of dragging progress bar events based on new or updated playback logs received from the plurality of client computing devices.

6. A client computing device of displaying an attention curve relative to a progress bar, comprising:
at least one processor; and
at least one memory communicatively coupled to the at least one processor and storing instructions that upon execution by the at least one processor cause the client computing device to:
send a request for acquiring a target video;
receive data associated with the target video, wherein the target video is divided into a plurality of predetermined time periods, and the data comprise a number of comment events and a number of dragging progress bar events within each predetermined time period of the target video;
determine an attention value corresponding to each predetermined time period based on the number of comment events and the number of dragging progress bar events within each predetermined time period of the target video;
generate an attention curve based on a plurality of attention values corresponding to the plurality of predetermined time periods of the target video; and
display the attention curve relative to a progress bar, wherein amplitude values of the attention curve relative to the progress bar are in proportion to the plurality of attention values corresponding to the plurality of predetermined time periods of the target video;
wherein the at least one memory further stores instructions that upon execution by the at least one processor cause the client computing device to:
determine the attention value corresponding to each predetermined time period based on a formula:

$$\text{Attention Value} = (|NBSE/SC| + 1) \times NDPBE,$$

wherein the NBSE indicates the number of comment events, the SC indicates a setting coefficient, and the NDPBE indicates the number of dragging progress bar events.

7. The client computing device of claim 6, the at least one memory further storing instructions that upon execution by the at least one processor cause the client computing device to:
detect at least one of comment events or dragging progress bar events generated by the client computing device during playing the target video;
add the detected comment events or dragging progress bar events to a playback log corresponding to the target video.

8. The client computing device of claim 7, the at least one memory further storing instructions that upon execution by the at least one processor cause the client computing device to:
send the playback log to server computing device when a playback of the target video 1s terminated, wherein the server computing device receives other playback logs from other client computing devices which have played the target video.

9. A server computing device of displaying an attention curve relative to a progress bar comprising:
at least one processor; and
at least one memory communicatively coupled to the at least one processor and storing instructions that upon execution by the at least one processor cause the server computing device to:
receive a request for acquiring a target video from a client computing device; obtain data associated with the target video, wherein the target video is divided into a plurality of predetermined time periods, and the data comprise a number of comment events and a number of dragging progress bar events within each predetermined time period of the target video;
send the data to the client computing device for display of an attention curve relative to a progress bar, wherein the attention curve is generated based on determining a plurality of attention value corresponding to the plurality of predetermined time periods according to the number of comment events and the number of dragging progress bar events within each predetermined time period of the target video;
wherein the at least one memory further stores instructions that upon execution by the at least one processor cause the server computing device to:
determine the number of comment events and the number of dragging progress events within each predetermined time period based on a plurality of playback logs sent from a plurality of client computing devices, wherein each of the plurality of playback logs comprises at least one of comment events or dragging progress bar events generated by a corresponding client computing device during playing the target video; and
determine which predetermined time period among the plurality of predetermined time periods each comment event or dragging progress bar event comprised in each of the plurality of playback logs belongs to.

10. The server computing device of claim 9, the at least one memory further storing instructions that upon execution by the at least one processor cause the server computing device to:
update the data associated with the target video by periodically determining an updated number of comment events and an updated number of dragging progress bar events based on new or updated playback logs.

11. A non-transitory computer-readable storage medium, storing computer-readable instructions that upon execution on a computing device cause the computing device at least to:

send a request for acquiring a target video;

receive data associated with the target video, wherein the target video is divided into a plurality of predetermined time periods, and the data comprises a number of comment events and a number of dragging progress bar events within each predetermined time period of the target video;

determine an attention value corresponding to each predetermined time period based on the number of comment events and the number of dragging progress bar events within each predetermined time period of the target video;

generate an attention curve based on a plurality of attention values corresponding to the plurality of predetermined time periods of the target video; and display the attention curve relative to a progress bar, wherein amplitude values of the attention curve relative to the progress bar are in proportion to the plurality of attention values corresponding to the plurality of predetermined time periods of the target video;

wherein the non-transitory computer-readable storage medium further stores computer-readable instructions that upon execution on the computing device cause the computing device at least to:

determine the attention value corresponding to each predetermined time period based on a formula:

$$\text{Attention Value} = (|NBSE/SC| + 1) \times NDPBE,$$

wherein the NBSE indicates the number of comment events the SC indicates a setting coefficient, and the NDPBE indicates the number of dragging progress bar events.

12. The non-transitory computer-readable storage medium of claim 11, further comprising computer-readable instructions that upon execution on the computing device cause the computing device at least to: detect at least one of comment events or dragging progress bar events generated by the computing device during playing the target video; and add the detected comment events or dragging progress bar events to a playback log corresponding to the target video.

13. The non-transitory computer-readable storage medium of claim 12, further comprising computer-readable instructions that upon execution on the computing device cause the computing device at least to:

send the playback log to a server computing device when a playback of the target video is terminated.

* * * * *